United States Patent
Neves et al.

(10) Patent No.: US 10,831,966 B1
(45) Date of Patent: Nov. 10, 2020

(54) MULTI-FANOUT LATCH PLACEMENT OPTIMIZATION FOR INTEGRATED CIRCUIT (IC) DESIGN

(71) Applicant: International Business Machines Corporation, Armonk, NY (US)

(72) Inventors: Jose Neves, Poughkeepsie, NY (US); Adam Matheny, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/567,050

(22) Filed: Sep. 11, 2019

(51) Int. Cl.
*G06F 30/00* (2020.01)
*G06F 30/392* (2020.01)

(52) U.S. Cl.
CPC .................. *G06F 30/392* (2020.01)

(58) Field of Classification Search
CPC ..................................... G06F 30/392
USPC ......................................... 716/124
See application file for complete search history.

(56) References Cited

U.S. PATENT DOCUMENTS

| | | | |
|---|---|---|---|
| 6,230,304 B1 | 5/2001 | Groeneveld et al. | |
| 6,440,780 B1 | 8/2002 | Kimura et al. | |
| 6,449,759 B1 | 9/2002 | Whitney et al. | |
| 6,701,507 B1 | 3/2004 | Srinivasan | |
| 6,769,104 B2 | 7/2004 | Rodgers et al. | |
| 7,051,310 B2 | 5/2006 | Tsao et al. | |
| 7,356,785 B2 | 4/2008 | Lu et al. | |
| 7,549,137 B2 | 6/2009 | Alpert et al. | |
| 7,551,985 B1 * | 6/2009 | Chen ................ G06F 30/327 |
| | | | 700/297 |
| 7,624,366 B2 | 11/2009 | Alpert et al. | |
| 7,653,884 B2 | 1/2010 | Furnish et al. | |
| 7,685,552 B2 | 3/2010 | Ishihara et al. | |
| 7,795,943 B2 | 9/2010 | Toyonoh et al. | |
| 7,917,880 B2 | 3/2011 | Mak et al. | |
| 8,010,926 B2 | 8/2011 | Alpert et al. | |
| 8,104,014 B2 | 1/2012 | Puri et al. | |

(Continued)

OTHER PUBLICATIONS

Held, S. et al., "Post-Routing Latch Optimization for Timing Closure," Research Institute for Discrete Mathematics, Bonn, Germany, 6 pages.

(Continued)

*Primary Examiner* — Suchin Parihar
(74) *Attorney, Agent, or Firm* — Cantor Colburn LLP; William Kinnaman

(57) ABSTRACT

Techniques for latches include ordering latches by connectivity from a source to sinks. An iterative process is performed which includes selecting a selected latch in the connectivity, drawing a bounding box around the selected latch to encompass input nets and output nets, and using a two-dimensional optimizer to find a new placement location for selected latch by solving for optimization criteria. The optimization criteria includes maximizing slack on the input and output nets of the selected latch, minimizing an absolute difference of the slack between the input output nets, and identifying the new placement location within the bounding box that balances maximizing the slack on input and output nets versus minimizing the absolute difference of the slack between input nets and output nets. The current location of the selected latch is updated between the source and sinks to be the new placement location identified in the bounding box.

20 Claims, 9 Drawing Sheets

(56) References Cited

U.S. PATENT DOCUMENTS

| | | | |
|---|---|---|---|
| 8,205,182 B1 | 6/2012 | Zlatanovici et al. | |
| 8,661,374 B2 | 2/2014 | Vishweshwara et al. | |
| 8,661,391 B1* | 2/2014 | Viswanath | G06F 30/392 |
| | | | 716/119 |
| 8,667,441 B2 | 3/2014 | Alpert et al. | |
| 8,677,299 B1 | 3/2014 | Alpert et al. | |
| 8,826,211 B1 | 9/2014 | Sood et al. | |
| 8,832,626 B2 | 9/2014 | Agrawal et al. | |
| 8,954,912 B2 | 2/2015 | Alpert et al. | |
| 8,966,425 B1 | 2/2015 | Eisenstadt et al. | |
| 9,135,375 B1 | 9/2015 | Sood et al. | |
| 9,411,912 B1 | 8/2016 | Sood et al. | |
| 9,792,398 B2 | 10/2017 | Xu et al. | |
| 10,417,375 B2 | 9/2019 | Chung et al. | |
| 2001/0010090 A1 | 7/2001 | Boyle et al. | |
| 2003/0135836 A1 | 7/2003 | Chang et al. | |
| 2004/0230933 A1 | 11/2004 | Weaver et al. | |
| 2006/0041852 A1* | 2/2006 | Drumm | G06F 30/327 |
| | | | 716/114 |
| 2008/0148203 A1 | 6/2008 | Alpert et al. | |
| 2008/0168411 A1* | 7/2008 | Mang | G06F 30/3312 |
| | | | 716/114 |
| 2008/0276212 A1 | 11/2008 | Albrecht | |
| 2010/0064264 A1* | 3/2010 | Amundson | G06F 30/327 |
| | | | 716/104 |
| 2012/0124539 A1 | 5/2012 | Alpert et al. | |
| 2013/0326451 A1 | 12/2013 | Cho et al. | |
| 2016/0188774 A1 | 6/2016 | Adya et al. | |
| 2017/0323030 A1* | 11/2017 | Datta | G06F 30/34 |

OTHER PUBLICATIONS

IBM "List of IBM Patents or Patent Applications Treated as Related; (Appendix P)", Filed Sep. 12, 2019, 2 pages.

Jesse Surprise et al., "Improved Clock Gating Latch Placement," U.S. Appl. No. 16/567,134, filed Sep. 11, 2019.

Jesse Surprise et al., "Improved Local Clock Buffer Controller Placement and Connectivity," U.S. Appl. No. 16/567,128, filed Sep. 11, 2019.

Jose Neves et al., "Single-Bit Latch Optimization for Integrated Circuit (IC) Design," U.S. Appl. No. 16/567,031, filed Sep. 11, 2019.

Jose Neves et al., "Net Routing for Integrated Circuit (IC) Design," U.S. Appl. No. 16/567,035, filed Sep. 11, 2019.

Jung, J. et al., "Integrated Latch Placement and Cloning for Timing Optimization," ACM Transactions on Design Automation of Electronic Systems, Feb. 2019, vol. 24, No. 2, Article 22, 17 pages.

MacQueen et al., "Some Methods for classification and Analysis of Multivariate Observations," Proceedings of 5th Berkeley Symposium on Mathematical Statistics and Probability, University of California Press, 1967, pp. 281-297.

Papa, D. et al., "Physical Synthesis With Clock-Network Optimization for Large Systems on Chips," IEEE Computer Society, Jul./Aug. 2011, Big Chips, 12 pages.

Wiswanathan, "Placement techniques for the physical synthesis of nanometer-scale integrated circuits," Iowa State University, Graduate Theses and Dissertations, 20758, 2009, 160 pages.

Transmittal Form PTO/SB/21, filed Mar. 17, 2020.

* cited by examiner

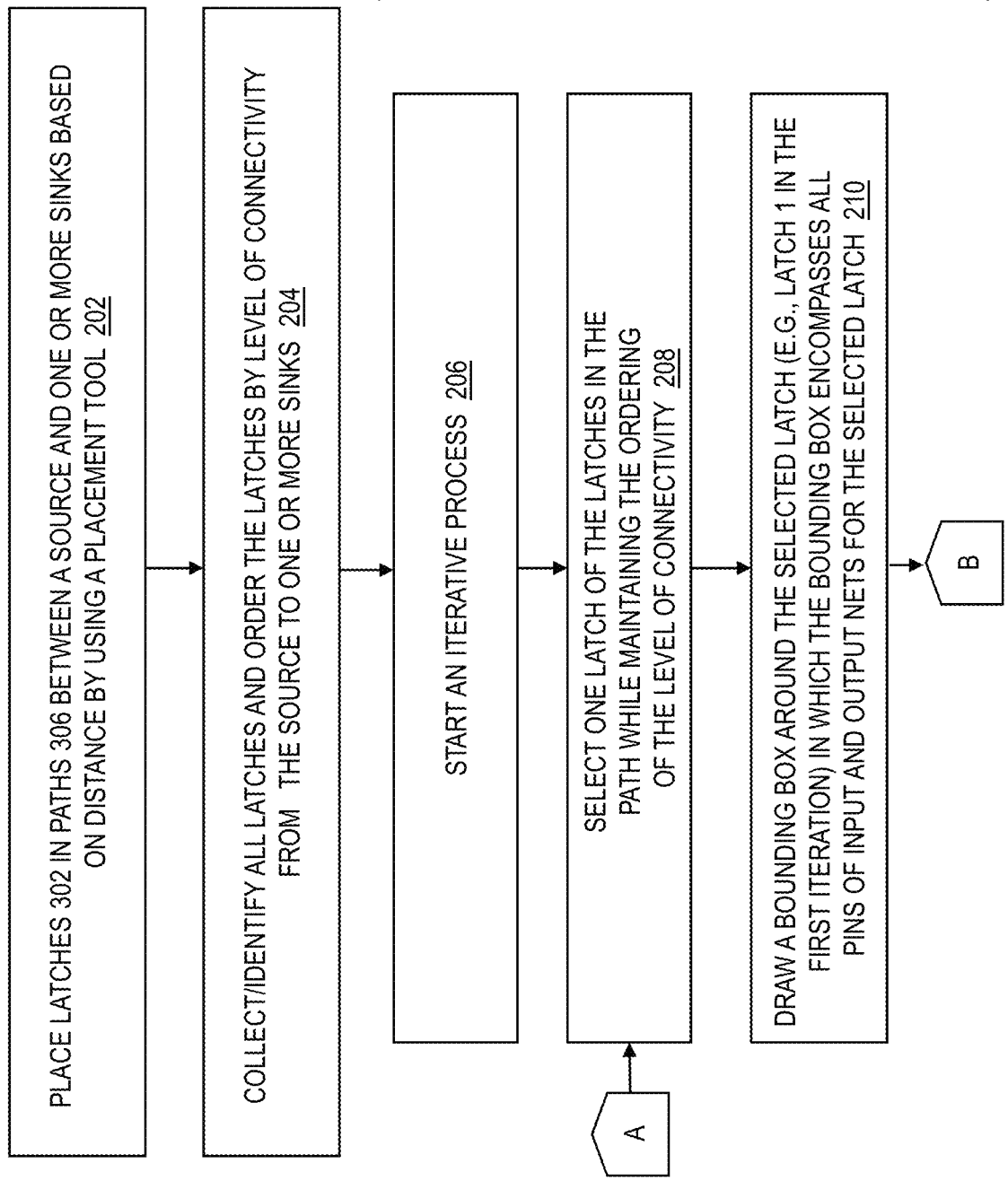

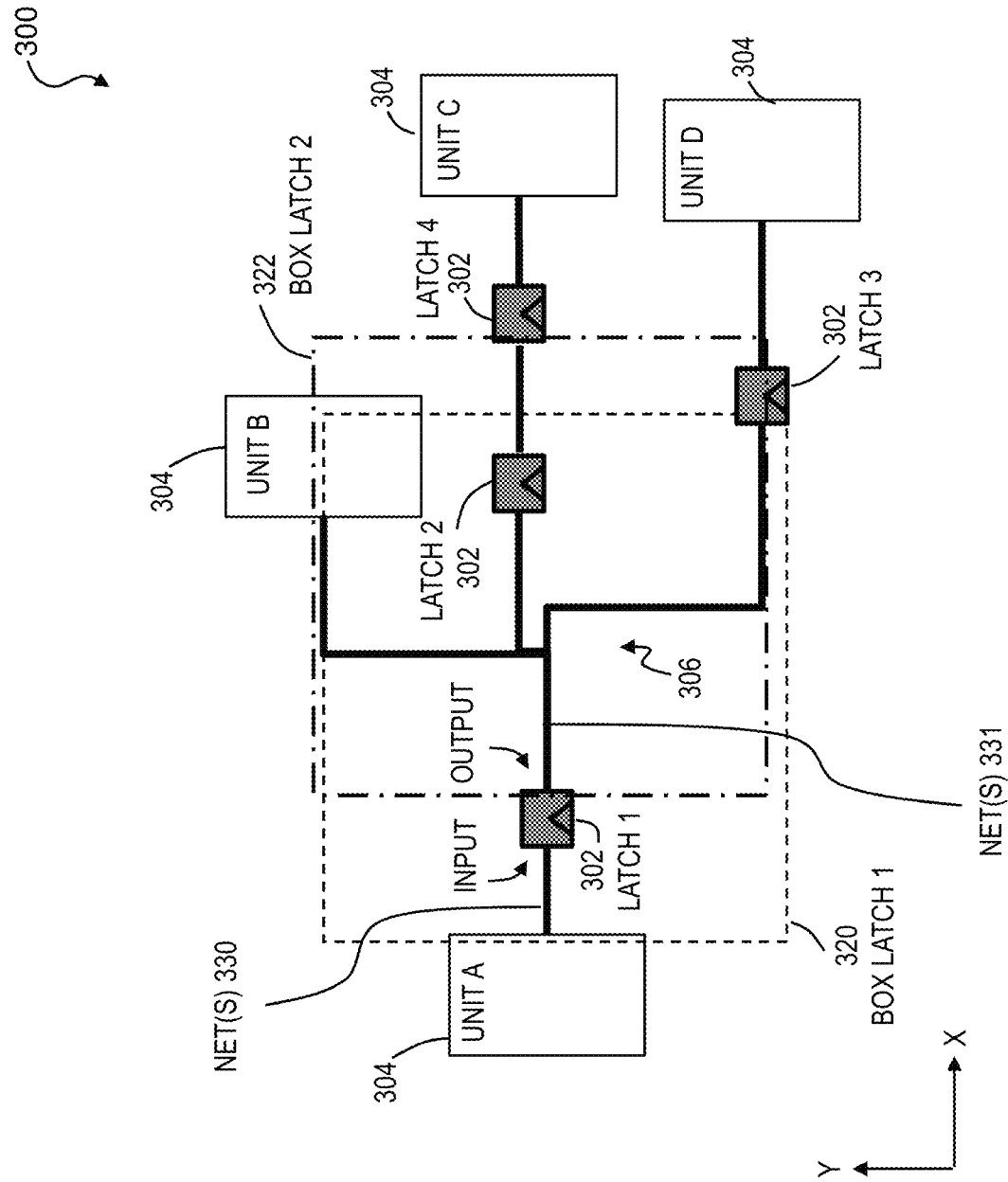

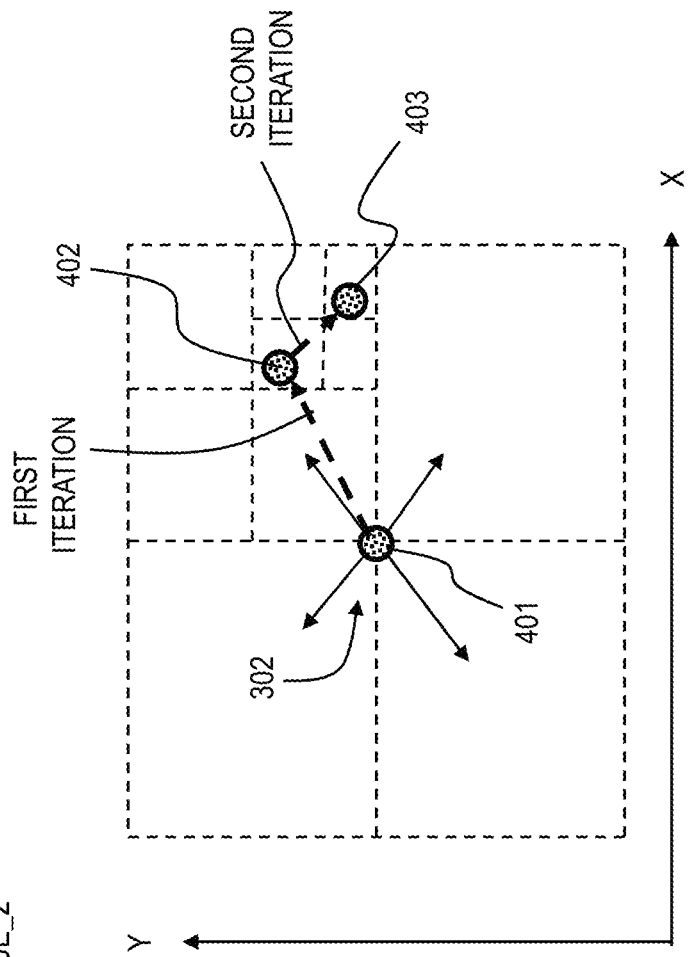

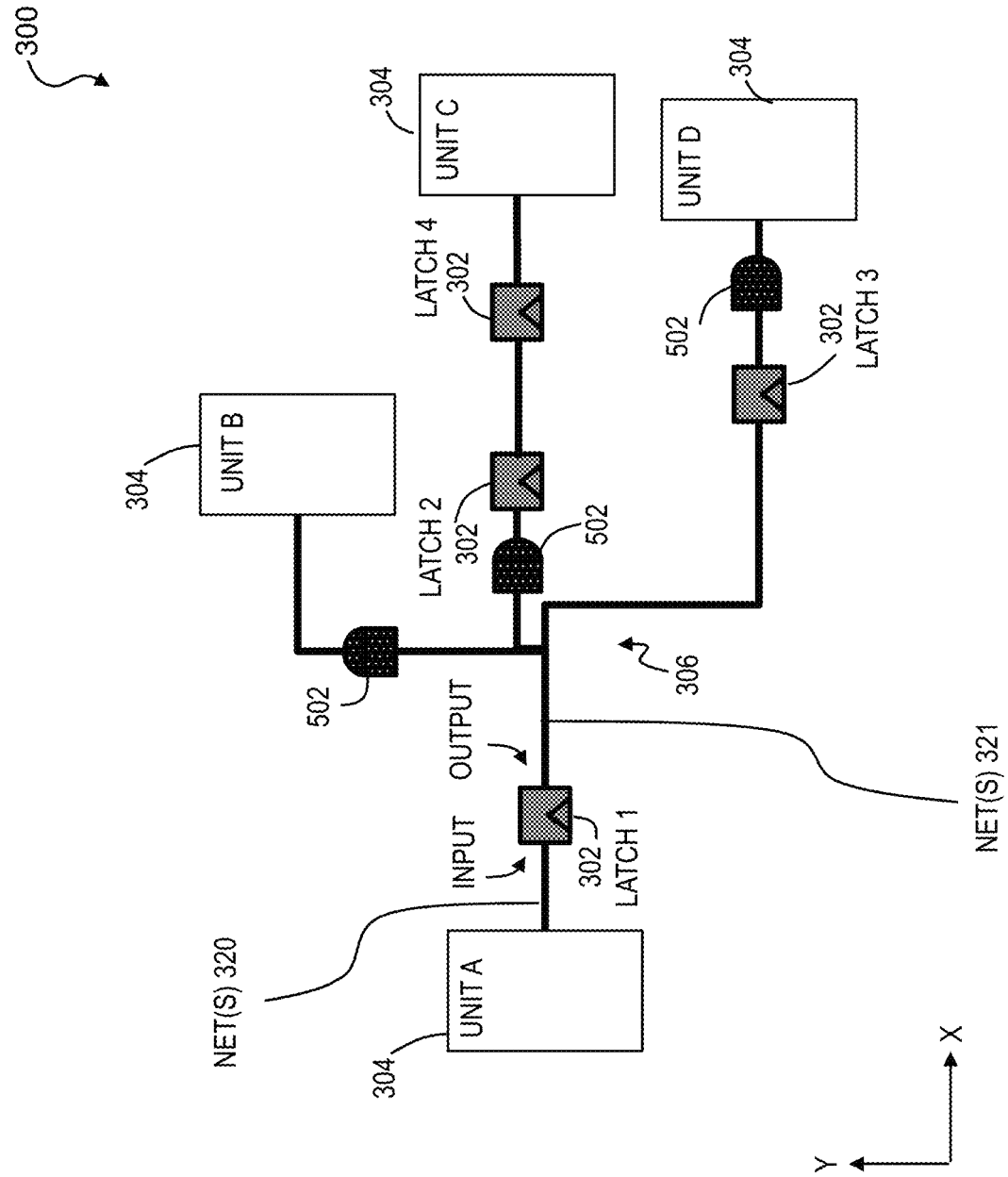

MULTI-FANOUT LATCH PLACEMENT OPTIMIZATION FOR INTEGRATED CIRCUIT (IC) DESIGN

BACKGROUND

The present invention generally relates to integrated circuits (ICs), and more specifically, to multi-fanout latch placement optimization for an IC design.

An IC chip may include a large number of electronic components that are fabricated by layering several different materials on a silicon base or wafer. The design of an IC transforms a circuit description into a geometric description which is known as a layout. The process of converting the functional specifications of an electronic circuit into a layout is called the physical design. The objective of the physical design is to determine an optimal arrangement of devices in a plane or in a three-dimensional space, and an efficient interconnection or routing scheme between the devices to obtain the desired functionality.

An IC chip includes elements, and connections between the elements, formed on a surface of a semiconductor substrate. The IC may include a large number of elements and require complex connections between the elements. Millions of circuits may need to be physically placed and connected on the chip. Placement may be a relatively time consuming process because the actual process of designing, placing, and connecting the circuits on the chip can affect the performance and timing requirements of the chip. Therefore, the design process affects placement of wire circuits or nets into a functional chip.

SUMMARY

Embodiments of the present invention are directed to multi-fanout latch placement optimization for an integrated circuit (IC) design. A non-limiting example computer-implemented method includes placing, by a processor, latches in a path between a source and one or more sinks in an integrated circuit (IC) design, ordering the latches by a level of connectivity from the source to the one or more sinks, and performing an iterative process. The iterative process includes selecting a selected latch of a current level of the connectivity, drawing a bounding box around the selected latch to encompass one or more input nets and one or more output nets for the selected latch, and using a two-dimensional optimizer to find a new placement location for the selected latch by solving for optimization criteria. The optimization criteria includes maximizing slack on the one or more input nets and the one or more output nets of the selected latch, minimizing an absolute difference of the slack between the one or more input nets and the one or more output nets of the selected latch, and identifying the new placement location within the bounding box that balances maximizing the slack on the one or more input nets and the one or more output nets versus minimizing the absolute difference of the slack between the one or more input nets and the one or more output nets. Further, the iterative process includes updating a current location of the selected latch between the source and the one or more sinks to be the new placement location identified within the bounding box, repeating the iterative process for the latches in the current level of the connectivity, and proceeding to performing the iterative process for the latches in a next level of the connectivity.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2A is a flow diagram of a process for multi-fanout latch placement optimization for an IC design in accordance with one or more embodiments of the present invention;

FIG. 3 is a block diagram of components of a system for multi-fanout latch placement optimization for an IC design in accordance with one or more embodiments of the present invention;

FIG. 4 is a block diagram of example movement in the system for multi-fanout latch placement optimization for the IC design in accordance with one or more embodiments of the present invention;

FIG. 5 is a block diagram of components of a system for multi-fanout latch placement optimization for an IC design in accordance with one or more embodiments of the present invention;

DETAILED DESCRIPTION

One or more embodiments of the present invention provide multi-fanout latch placement optimization for an IC design. An IC may include a relatively large number of latches and gates which are connected between endpoints such as a source and one or more sinks. An optimization is provided for the placement or movement of latches and gates between endpoints based on optimization criteria. The optimization can be used for from endpoint to endpoint nets (e.g., from a source to one sink) as well as for multi-sink nets (e.g., from a source to multiple sinks). One or more embodiments of the invention may use a multi-dimensional optimizer, use one pass optimization, include general purpose gates not just latches, and work with multiple timing modes from virtual mode to detailed mode where virtual mode allows movement with automatic wire tagging.

Figure 1:
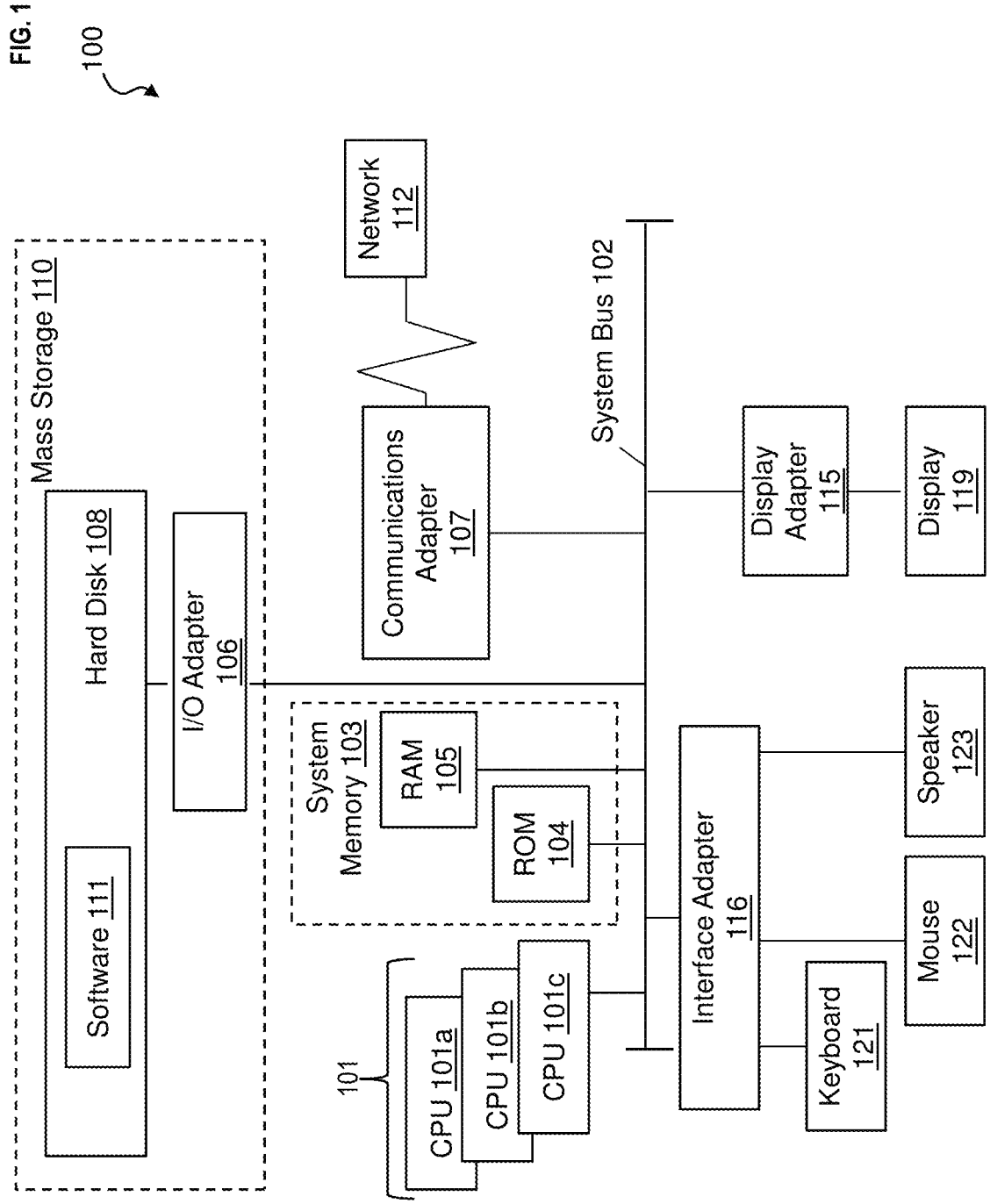
FIG. 1 is a block diagram of an example computer system for use in conjunction with one or more embodiments of a multi-fanout latch placement optimization for an integrated circuit (IC) design.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2B:
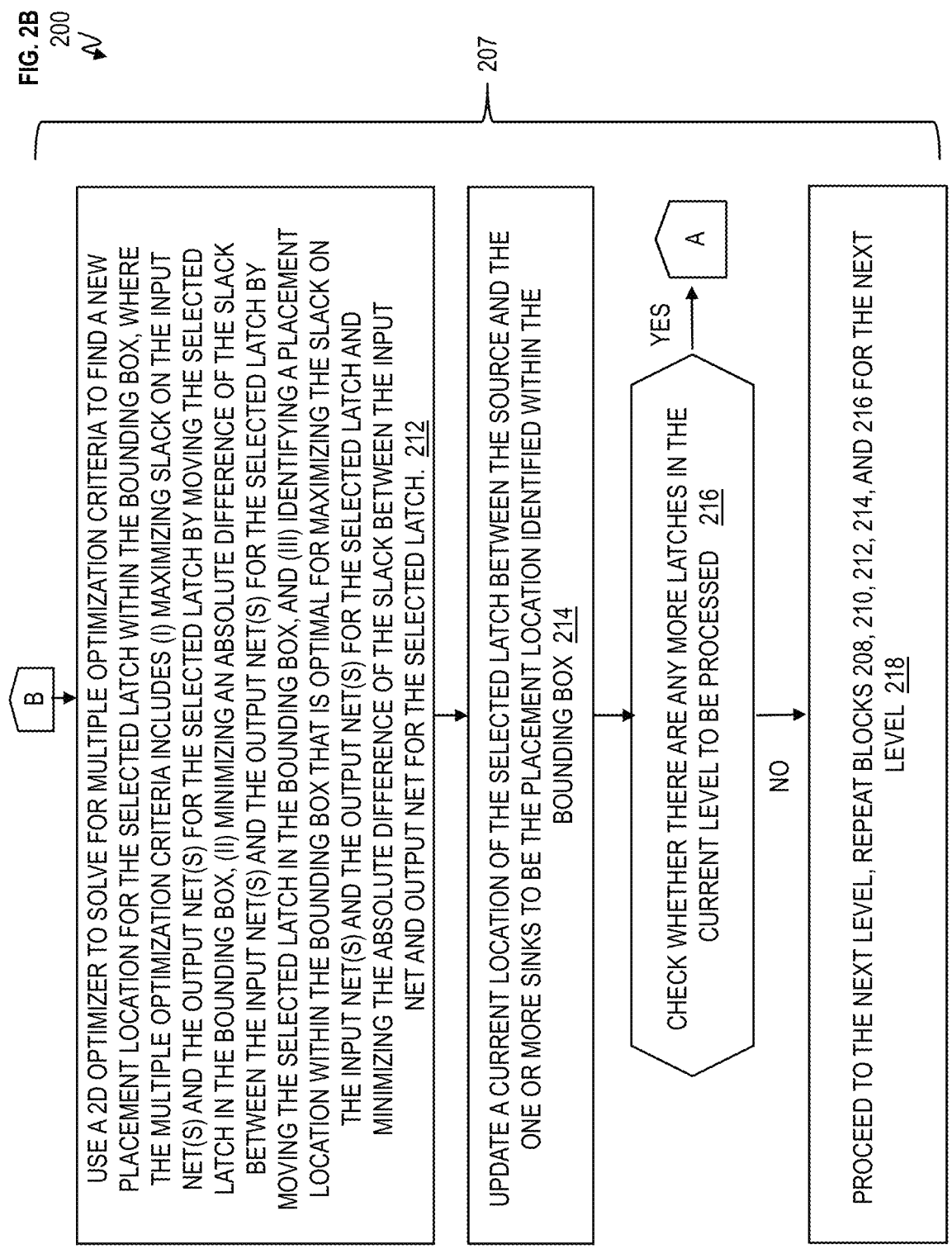
FIG. 2B continues the flow diagram in FIG. 2A of the process for multi-fanout latch placement optimization for the IC design in accordance with one or more embodiments of the present invention.
Figure 2C:
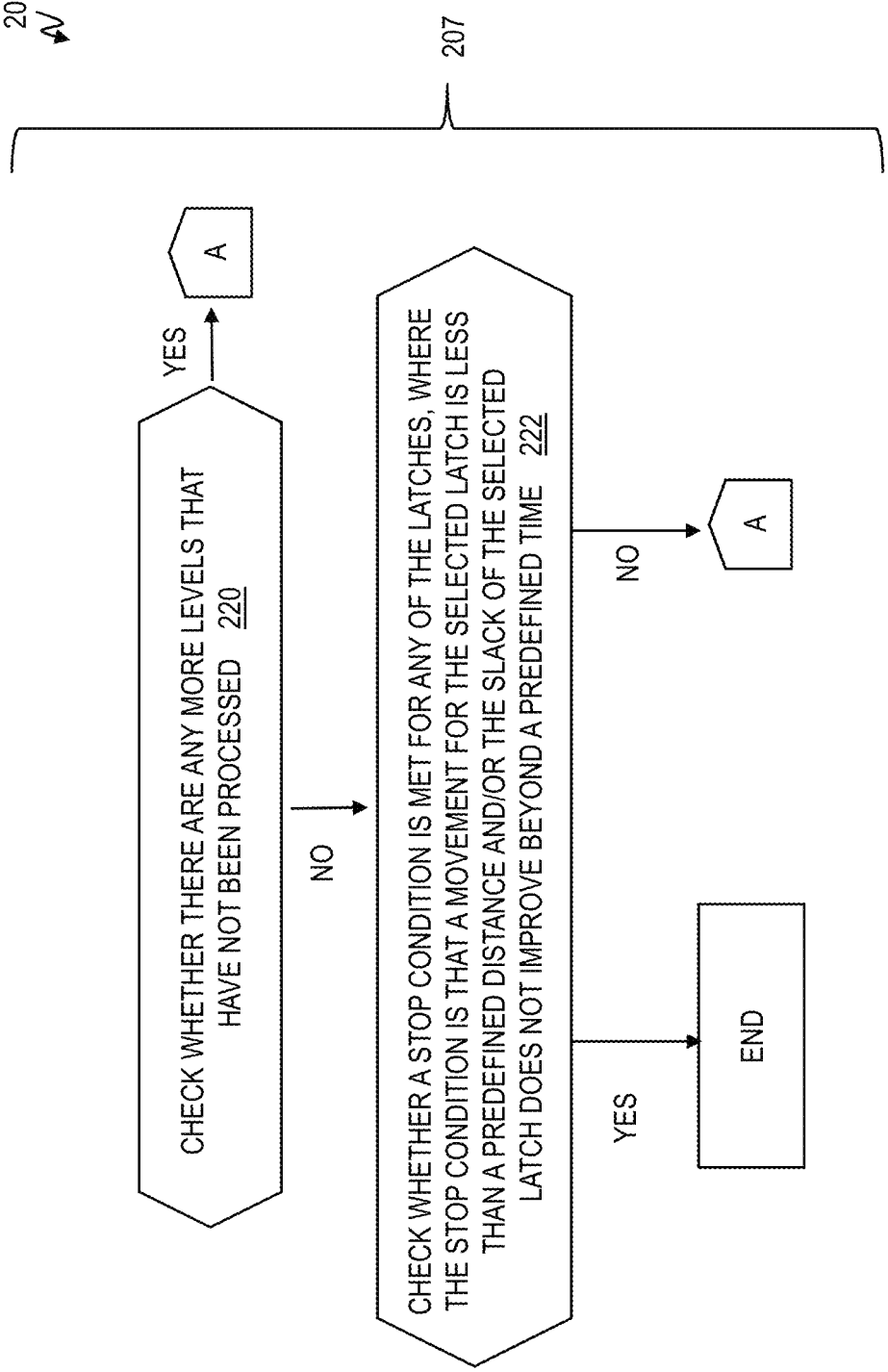
FIG. 2C continues the flow diagram in FIGS. 2A and 2B of the process for multi-fanout latch placement optimization for the IC design in accordance with one or more embodiments of the present invention.

FIGS. 2A, 2B, and 2C illustrate a process flow diagram of a method 200 for multi-fanout latch placement optimization for an IC design in accordance with one or more embodiments of the present invention. Reference can be made to FIG. 3 which illustrates a block diagram of components of a system 300 for multi-fanout latch placement optimization for an IC design in accordance with one or more embodiments of the present invention. The system 300 can be representative of an IC design for an integrated circuit.

Method 200 of FIGS. 2A, 2B, and 2C may be implemented in conjunction with any appropriate computer system, such as computer system 100 of FIG. 1. Embodiments of method 200 may be implemented in software 111 and may operate on data stored in mass storage 110 and/or system memory 103. Although latches are discussed for illustrative purposes and not limitation, it should be appreciated that the method 200 is not limited to latches but applies to latches, gates, and various combinations of latches and gates. At block 202 of method 200, the computer system 100 is configured to place latches 302 (and/or gates 502 depicted in FIG. 5) in paths 306 between a source and one or more sinks based on distance, for example, by using a placement tool. The paths 306 are the wiring/nets connecting units 304 to other units 304 with intermediate components such as latches 302, gates 502, etc., in between. The units 304 may be a macro or an intellectual property (IP) unit in the IC design.

At block 204, the computer system 100 is configured to collect/identify all latches 302 (and/or gates 502) and order the latches 302 (and/or gates 502) by level of connectivity from the source to one or more sinks. In the example system 300, the source is unit A (e.g., unit 304) and the sinks are units B, C, D (e.g., other units 304). In some embodiments of the invention, there may be one source connected to one sink without the output of the source fanning out to more than one sink. The current or signal travels from the source to sink, such that the one or more sinks receive the output of the source. Ordering the latches 302 (and/or gates 502) by level of connectivity includes ranking latches closest to the source (e.g., unit A) in a lowest level/first level through ranking latches closest to the sink in a highest level/last level, while latches in between lowest level/first level and highest level/last level are ranked in intermediary levels. Accordingly, latch 1 is in level 1 (because it is the closest to the source (e.g., unit A)) in FIG. 3, latch 2 and latch 3 are in level 2 (which is the next closest to the source), and latch 4 is in level 3 (because latch 4 is the furthest from the source (e.g., unit A) and because when walking from the source (e.g., unit A) to sink (e.g., unit C), there are three latches in series); however, when walking/proceeding from the same source (e.g., unit A) to the sink in unit D, there are only two latches in series (e.g., latch 1 and latch 3) resulting in two levels.

At block 206, the computer system 100 is configured to start an iterative process 207. At block 208 of iterative process 207, the computer system 100 is configured to select one latch (and/or gate 502) of the latches 302 (and/or gates 502) in the path 306 while maintaining the ordering of the level of connectivity. According to the order of level of connectivity, the computer system 100 selects latch 1 (and/or gate) of level 1 which is closest to unit A (i.e., the source). At block 210 of iterative process 207, the computer system 100 is configured to draw a bounding box around the selected latch (e.g., latch 1 in the first iteration) in which the bounding box encompasses all pins of input and output nets for the selected latch. For example, a bounding box 320 (e.g., bounding box latch 1) is drawn around latch 1 to include the input nets/wires 330 and output nets/wires 331 connected to latch 1. For explanation purposes, an example bounding box 332 is also shown for latch 2, but bounding boxes are not illustrated for latches 3 and 4 although bounding boxes are utilized when latches 3 and 4 are processed by the computer system 100. The bounding is redrawn for every iteration since the latches move, moving the sinks, or edges of the box. After going through all levels of latches at least once (e.g., after at least on iteration), all latches may move to a new location. As such, the bounding box of latch 1 has new dimensions in the next iteration (as opposed to the previous iteration) because latches 2 and 3 may have moved to a new position.

At block 212 of iterative process 207, the computer system 100 is configured to use a two-dimensional (2D) optimizer to solve for multiple optimization criteria to find a new placement location for the selected latch (and/or gate) within the bounding box (e.g., bounding box 320 for latch 1), where the multiple optimization criteria includes (i) maximizing slack on the input net(s) and the output net(s) for the selected latch by moving the selected latch in the bounding box, (ii) minimizing an absolute difference of the slack between the input net(s) and the output net(s) for the selected latch by moving the selected latch in the bounding box, and/or (iii) identifying a placement location within the bounding box that is optimal for maximizing the slack on the input net(s) and the output net(s) for the selected latch and minimizing the absolute difference of the slack between the input net and output net for the selected latch. The software 111 may incorporate and/or utilize a multi-dimensional optimization algorithm. Maximizing slack on the input net(s) 330 means moving the selected latch 302 in the x and y directions until the input slack on the input net(s) 330 is largest, such as 20 picoseconds (ps), and maximizing slack on the output net(s) 331 means moving the selected latch in the x and y directions until the output slack on output net(s) is largest, such as 30 ps. The absolute difference between the input slack on input net(s) 330 and output slack on output net(s) 331 is |20−30|=10 ps. To minimize the absolute difference, the selected latch 302 is further moved in the x and y directions within the bounding box until the input slack is about equal, nearly equal, and/or equals the output slack. For example, the selected latch can be moved until the input slack on input net(s) 330 is about 25 ps and output slack on output net(s) 331 is about 25 ps, which has an absolute difference of 0.

At block 214 of iterative process 207, the computer system 100 is configured to update a current location of the selected latch between the source and the one or more sinks to be the placement location identified within the bounding box (e.g., bounding box 320 for latch 1).

At block 216 of iterative process 207, the computer system 100 is configured to check whether there are any more latches in the current level being processed (e.g., current level is level 1 at the start of the iterative process). When there are more latches 302 to be processed in the current level of block 216, the computer system 100 is configured to repeat blocks 208-216 for all the latches 302 in the current level. When there are no more latches 302 to be processed in the current level, the iterative process 207 flows to block 218; at block 218 of iterative process 207, the computer system 100 is configured to proceed to the next level (e.g., level 2 for latches 2 and 3, respectively) for processing and repeat blocks 208, 210, 212, 214, and 216 for the next level (e.g., level 2 for latch 2 using bounding box 322 and then latch 3). It is noted that latch 3, also in level 2, requires its own bounding box (e.g., not shown) for conciseness prior to optimizing the location.

At block 220 of iterative process 207, the computer system 100 is configured to check whether there are any more levels that have not been processed for the current iteration. If there are more levels that have not been processed in block 220, the computer system 100 is configured to continue processing for each successive level through the level driving the sinks (i.e., last level) and proceeds back to block 208. The level driving the sinks is level 3 in this example, which includes latch 4 driving unit C (e.g., sink). It is noted that latch 1 drives unit B but latch 1 has already been processed in the first level. When there are not any more levels that need to be processed for the current iteration, the flow proceeds to block 222. For example, if the current iteration is the first iteration and there are not any more levels of connectivity to process, this means it will be time for the second iteration to be executed based on the results of block 222.

At block 222 of iterative process 207, the computer system 100 is configured to check whether a stop condition is met for any of the latches 302, where the stop condition is met when the movement for the selected latch is less than a predefined distance/value (e.g., output slack <the predefined distance/value) and/or the slack of the selected latch does not improve beyond a predefined time/value (e.g., slack improvement <predetermined time/value). When the stop condition is met at block 220, the iterative process 207 ends. When the stop condition at block 220 is not met, the computer system 100 is configured to return back to level 1 and repeat the iterative process of blocks 208-220 which will continue through the last level (e.g., level 3). All latches move at most once before the software 111 of computer system 100 returns to the first latch and moves it again. Latches and gates that meet constraints of the stop condition stay in place during the subsequent iteration. In one or more embodiments of the invention, when the condition for stopping is met any latches meeting the stop condition are skipped in any subsequent iterations. In one or more embodiments of the invention, the stop condition at block 220 can be met for any single latch and the process ends for all latches 302. In one or more embodiments of the invention, the stop condition at block 220 can be met for one latch (e.g., latch 1) but not the other latches (e.g., latches 2, 3, 4), and the iterative process 207 will continue for the other latches but stops/skips for any latch meeting the stop condition.

FIG. 4 illustrates a block diagram of example movement in the system 300 for multi-fanout latch placement optimization for the IC design in accordance with one or more embodiments of the present invention. Some details of the system 300, such as latches 302, units 304, paths 306, etc.) are omitted for conciseness but it should be appreciated that the omitted details are shown in FIG. 3. The initial/current location of the selected latch 302 may start at location 401, and the first iteration of the iterative process 207 of method 200 begins for the selected latch 302. After completing the first iteration of the iterative process 207, the latch 302 has moved from location 401 to location 402. Now, the current location of the selected latch 302 starts at location 402, and the second iteration of the iterative process 207 of method 200 begins for the selected latch 302. After completing the second iteration of the iterative process 207, the latch 302 has moved from location 402 to location 403, and the second iteration for the selected latch stops because a stop condition has been met. As noted above, other latches 302 can continue the iterative process 207 of method 200 in one or more embodiments until each latch respectively meets the stop condition. For example, the stop condition is met when there is no movement for the latch (e.g., in the x or y direction), the slack on one or more input nets or one or more output nets of the latch does not improve beyond a predetermined value, and/or the movement for the latch (e.g., in the x or y direction) is less than are predetermined value.

FIG. 5 illustrates a block diagram of the system 300 for latch and gate multi-fanout latch placement optimization for the IC design in accordance with one or more embodiments of the present invention. Some details of the system 300 are omitted for conciseness and gates 502 are additionally shown but it should be appreciated that the omitted details would be incorporated appropriately. The gates 502 can be any type of logic gate, such as AND gates, OR gates, NAND gates, NOR gates, buffers, etc.

Each gate 502 is treated similarly as discussed for latches 302 by the software 111 of computer system 100, and each gate 502 is analogously moved within a bounding box, which is omitted in FIG. 5 and illustrated in FIG. 3, as discussed herein for latches 302 unless a particular gate has its placement fixed. Moreover, the gates 502 are processed during method 200 just as discussed above for the latches 302. Additionally, processing of method 200 for the gates 502 can be run in virtual timing mode which allows for wire tagging to be performed as well. Virtual timing mode allows for movement of the gates 502 (and latches 302) with automatic tagging that associates nets with wire codes that have specific electrical properties.

Figure 6:
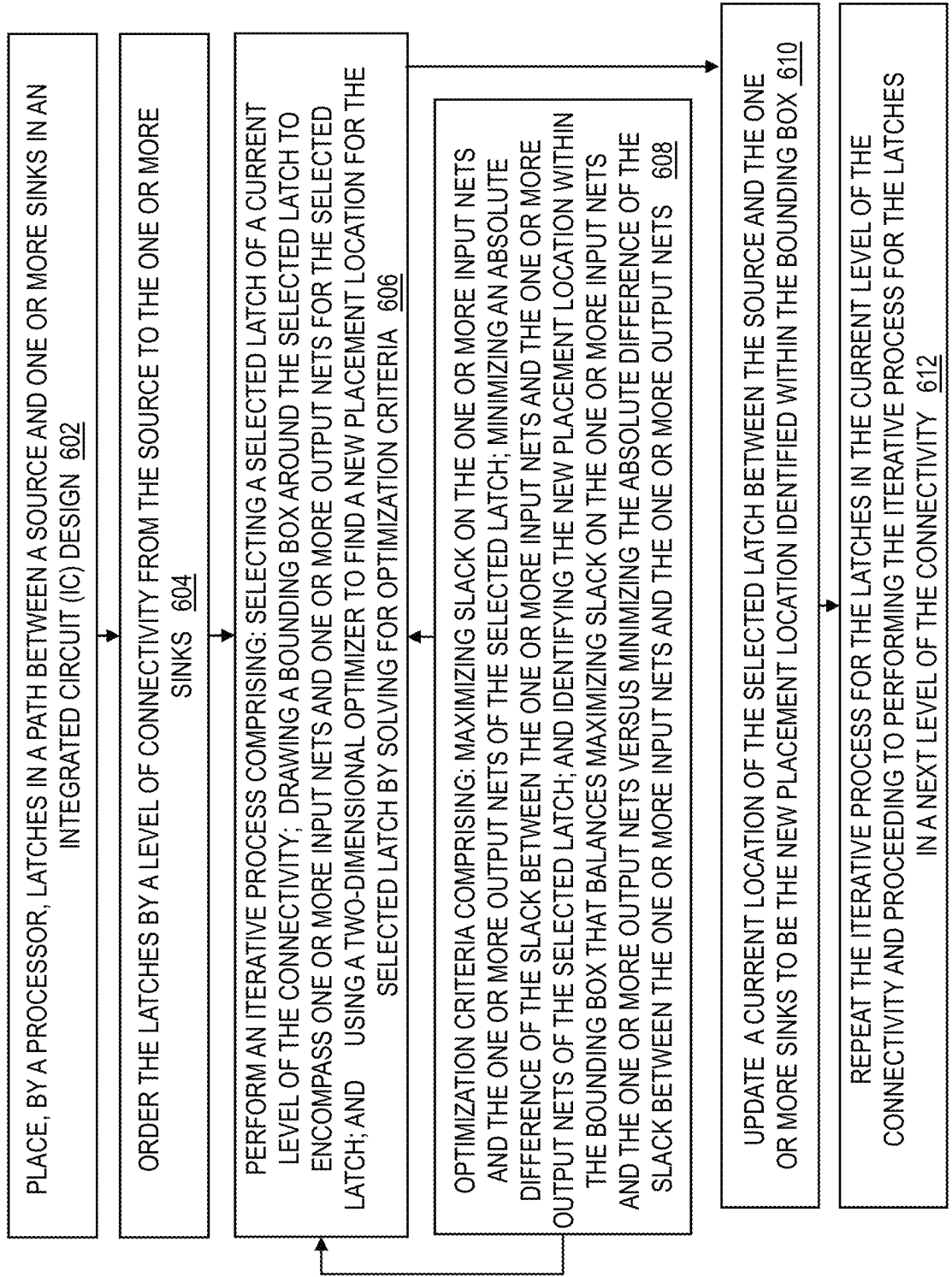
FIG. 6 is a flow diagram of a computer-implemented method for multi-fanout latch placement optimization for an IC design in accordance with one or more embodiments of the present invention.

FIG. 6 is a flow diagram of a computer-implemented method 600 for multi-fanout latch placement optimization for an IC design in accordance with one or more embodiments of the present invention. Computer system 100 can be utilized to perform the method 600, and the method 600 may be implemented in software 111. Reference can be made to any of the figures discussed herein. At block 602, the method 600 includes placing, by a processor (such as processors 101 of computer system 100), latches 302 in a path between a source (e.g., unit 304 such as unit A) and one or more sinks (e.g., units 304 such as units B, C, D) in an integrated circuit (IC) design (e.g., such as system 300). At block 604, the computer system 100 is configured to order the latches 302 by a level of connectivity from the source to the one or more sinks.

At block 606, the computer system 100 is configured to perform an iterative process 207 including: selecting a selected latch 302 of a current level of the connectivity; drawing a bounding box around the selected latch 302 to encompass one or more input nets and one or more output nets (e.g., input nets/wires 330 and output nets/wires 331) for the selected latch 302; using a two-dimensional optimizer (e.g., which can be integrated in software 111 and/or utilized by software 111) to find a new placement location for the selected latch 302 by solving for optimization criteria. At block 608, the optimization criteria includes maximizing slack on the one or more input nets and the one or more output nets of the selected latch 302; minimizing an absolute difference of the slack between the one or more input nets and the one or more output nets of the selected latch 302; and identifying the new placement location within the bounding box that balances maximizing the slack on the one or more input nets and the one or more output nets versus minimizing the absolute difference of the slack between the one or more input nets and the one or more output nets.

At block 610, the computer system 100 is configured to update a current location (e.g., location 401) of the selected latch 302 between the source and the one or more sinks to be the new placement location (e.g., location 402, location 403, etc.) identified within the bounding box (e.g., bounding box 320, bounding box 322, etc.). At block 612, the computer system 100 is configured to repeat the iterative process 207 for the other latches 302 (which have not been processed yet during the current iteration) in the current level of the connectivity and proceed to performing the iterative process 207 for the latches 302 in a next level of the connectivity.

In one or more embodiments of the invention, ordering the latches 302 (and gates 502) by the level of connectivity from the source to the one or more sinks includes ranking the latches in a sequential order of levels starting with the latches 302 closest to the source being in a lowest level through the latches closest to the sink being in a highest level, while the latches in between the lowest level and the highest level are ranked in intermediary levels. Maximizing slack on the one or more input nets and the one or more output nets of the selected latch includes moving the selected latch 302 in two dimensions (e.g., x and y directions) within the bounding box to increase the slack. Minimizing the absolute difference of the slack between the one or more input nets and the one or more output nets of the selected latch comprises moving the selected latch in two dimensions (e.g., x and y directions) within the bounding box to equalize the absolute difference of the slack such that the slack on the one or more input nets and the one or more output nets of the selected latch is about equal. Identifying the new placement location (e.g., locations 402, 403, etc.) within the bounding box that balances maximizing the slack on the one or more input nets and the one or more output nets versus minimizing the absolute difference of the slack between the one or more input nets and the one or more output nets includes moving the selected latch in two dimensions (e.g., x and y directions) within the bounding box while accounting for both maximizing the slack and minimizing the absolute difference of the slack. When maximizing the slack and minimizing the absolute difference of the slack are not able to be balanced, the selected latch is configured to be moved to optimize one of maximizing the slack or minimizing the absolute difference of the slack at an expense of the other one.

In one or more embodiments of the invention, repeating the iterative process 207 for the latches 302 in the current level of the connectivity and proceeding to perform the iterative process for the latches in a next level of the connectivity comprises checking for a stop condition. When the stop condition is met, the iterative process 207 stops and when the stop condition is not met, the iterative process 207 continues.

Method 200 of FIG. 2 and method 600 of FIG. 6 (which includes features of method 200 and vice versa) may be repeated for any appropriate number of latches and gates in an IC design and for any appropriate number of times. When the computer system 100 determines that movement of the latches and gates of method 200 and 600 is complete for the IC design, a physical chip can be fabricated based on the IC design. Fabrication of a physical chip based on the IC design is discussed in further detail below with respect to FIG. 7.

Figure 7:
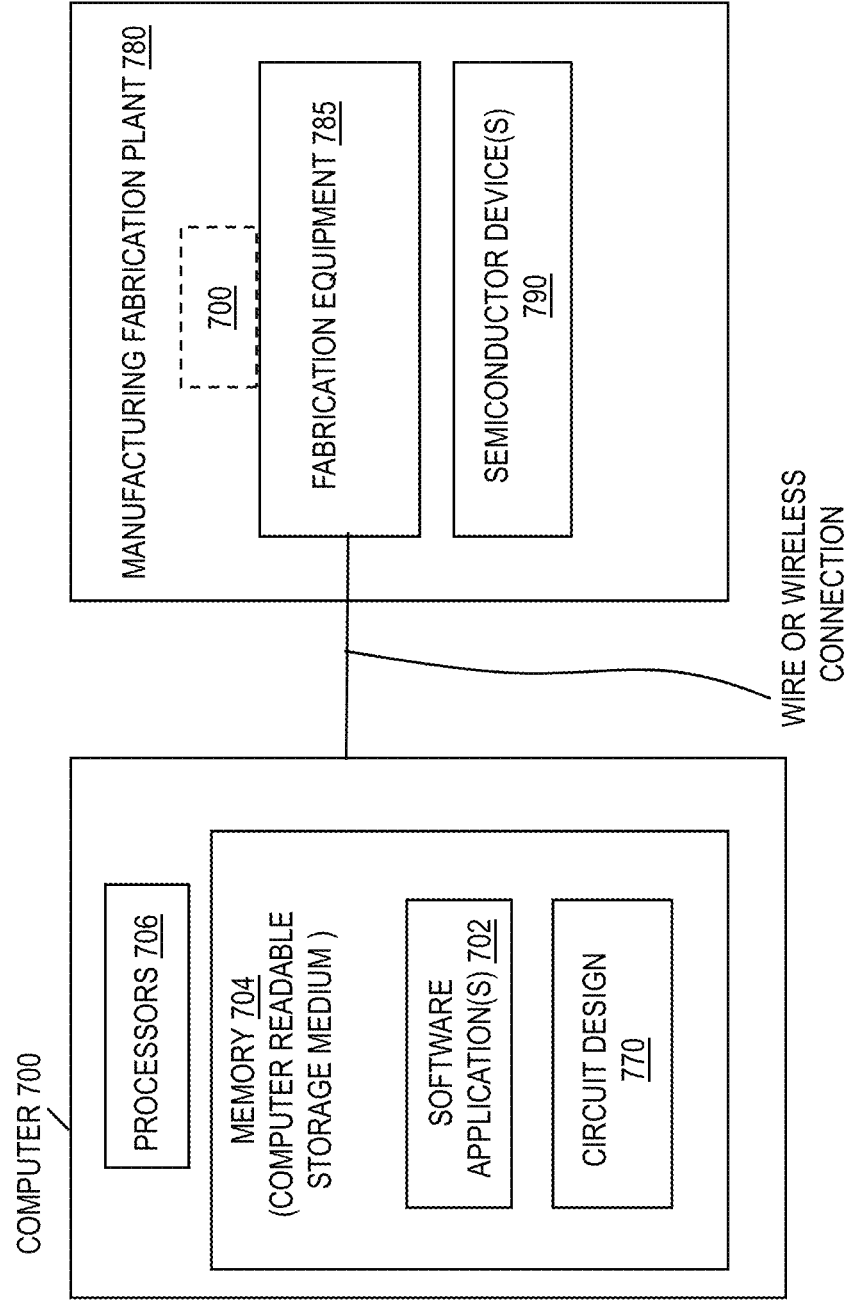
FIG. 7 depicts a system of a computer system integrated with a manufacturing fabrication plant in accordance with one or more embodiments of the present invention.

In one or more embodiments of the invention, a semiconductor layout (or IC design) can be generated using the computer system 700 shown in FIG. 7. The computer system 700 has one or more software applications 702 configured to function and implement operations as discussed herein. For example, software applications 702 (as discussed herein for software 111 of computer system 100) may include one or more routines placing, moving, configuring latches 302 and gates 502 for an IC design. A semiconductor layout can be constructed by the software application 702 of the computer 700 according to method 200 of FIG. 2 and method 600 of FIG. 6 as described above to build the semiconductor device 790 (e.g., an integrated circuit). The computer 700 is configured to guarantee design rule cleanliness (i.e., pass) for the semiconductor device before and/or without requiring a design rule check. The software applications 702 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 700 is coupled to, integrated with, and/or part of the fabrication equipment 785 at the manufacturing fabrication plant 780 (so as to communicate with and/or control operations of the fabrication equipment 785) to thereby fabricate semiconductor device(s) 790 as depicted in FIG. 7, as understood by one skilled in the art. The computer 700 includes one or processors 706 configured to execute one or more software applications 702 in memory 704. The computer 700 receives input of a design 770 for the semiconductor device 790, and the computer 700 is configured to develop/form the semiconductor layout for the semiconductor device in order to build the semiconductor device. The semiconductor layout is a physical design released to the manufacturing fabrication (Fab) plant 780 and physically fabricated by the fabrication equipment 785 to produce the semiconductor device 790. The manufacturing fabrication plant 780 builds the photo mask from the semiconductor layout as a physical design, and then builds the actual product using the photo mask. The product is an integrated circuit (i.e., semiconductor device 790) on a wafer according to the semiconductor layout (physical design). There may be numerous integrated circuits on a wafer, and each integrated circuit may be diced into an individual chip.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   placing, by a processor, latches in a path between a source and one or more sinks in an integrated circuit (IC) design;
   ordering the latches by a level of connectivity from the source to the one or more sinks; and
   performing an iterative process comprising:
      selecting a selected latch of a current level of the connectivity;
      drawing a bounding box displayed around the selected latch to encompass one or more input nets and one or more output nets for the selected latch;
      using a two-dimensional optimizer to find a new placement location for the selected latch by solving for optimization criteria, the optimization criteria comprising:
         maximizing slack on the one or more input nets and the one or more output nets of the selected latch;
         minimizing an absolute difference of the slack between the one or more input nets and the one or more output nets of the selected latch; and
         identifying the new placement location within the bounding box that balances maximizing the slack on the one or more input nets and the one or more output nets versus minimizing the absolute difference of the slack between the one or more input nets and the one or more output nets;
      updating a current location of the selected latch between the source and the one or more sinks to be the new placement location identified within the bounding box; and
      repeating the iterative process for the latches in the current level of the connectivity and proceeding to performing the iterative process for the latches in a next level of the connectivity.

2. The computer-implemented method of claim 1, wherein ordering the latches by the level of connectivity from the source to the one or more sinks comprises ranking the latches in a sequential order of levels starting with the latches closest to the source being in a lowest level through the latches closest to the one or more sinks being in a highest level, while the latches in between the lowest level and the highest level are ranked in intermediary levels.

3. The computer-implemented method of claim 1, wherein maximizing slack on the one or more input nets and the one or more output nets of the selected latch comprises moving the selected latch in two dimensions within the bounding box to increase the slack.

4. The computer-implemented method of claim 1, wherein minimizing the absolute difference of the slack between the one or more input nets and the one or more output nets of the selected latch comprises moving the selected latch in two dimensions within the bounding box to equalize the absolute difference of the slack such that the slack on the one or more input nets and the one or more output nets of the selected latch is about equal.

5. The computer-implemented method of claim 1, wherein identifying the new placement location within the bounding box that balances maximizing the slack on the one or more input nets and the one or more output nets versus minimizing the absolute difference of the slack between the one or more input nets and the one or more output nets comprises moving the selected latch in two dimensions within the bounding box while accounting for both maximizing the slack and minimizing the absolute difference of the slack.

6. The computer-implemented method of claim 5, wherein when maximizing the slack and minimizing the absolute difference of the slack are not able to be balanced, the selected latch is moved to optimize one of maximizing the slack or minimizing the absolute difference of the slack at an expense of another one.

7. The computer-implemented method of claim 1, wherein repeating the iterative process for the latches in the current level of the connectivity and proceeding to perform the iterative process for the latches in the next level of the connectivity comprises checking for a stop condition.

8. The computer-implemented method of claim 7, wherein when the stop condition is met, the iterative process stops and when the stop condition is not met, the iterative process continues.

9. A system comprising:
a memory having computer readable instructions; and
one or more processors for executing the computer readable instructions, the computer readable instructions controlling the one or more processors to perform operations comprising:
placing, by the one or more processors, latches in a path between a source and one or more sinks in an integrated circuit (IC) design;
ordering the latches by a level of connectivity from the source to the one or more sinks;
performing an iterative process comprising:
selecting a selected latch of a current level of the connectivity;
drawing a bounding box displayed around the selected latch to encompass one or more input nets and one or more output nets for the selected latch; and
using a two-dimensional optimizer to find a new placement location for the selected latch by solving for optimization criteria, the optimization criteria comprising:
maximizing slack on the one or more input nets and the one or more output nets of the selected latch;
minimizing an absolute difference of the slack between the one or more input nets and the one or more output nets of the selected latch; and
identifying the new placement location within the bounding box that balances maximizing the slack on the one or more input nets and the one or more output nets versus minimizing the absolute difference of the slack between the one or more input nets and the one or more output nets;
updating a current location of the selected latch between the source and the one or more sinks to be the new placement location identified within the bounding box; and
repeating the iterative process for the latches in the current level of the connectivity and proceeding to performing the iterative process for the latches in a next level of the connectivity.

10. The system of claim 9, wherein ordering the latches by the level of connectivity from the source to the one or more sinks comprises ranking the latches in a sequential order of levels starting with the latches closest to the source being in a lowest level through the latches closest to the one or more sinks being in a highest level, while the latches in between the lowest level and the highest level are ranked in intermediary levels.

11. The system of claim 9, wherein maximizing slack on the one or more input nets and the one or more output nets of the selected latch comprises moving the selected latch in two dimensions within the bounding box to increase the slack.

12. The system of claim 9, wherein minimizing the absolute difference of the slack between the one or more input nets and the one or more output nets of the selected latch comprises moving the selected latch in two dimensions within the bounding box to equalize the absolute difference of the slack such that the slack on the one or more input nets and the one or more output nets of the selected latch is about equal.

13. The system of claim 9, wherein identifying the new placement location within the bounding box that balances maximizing the slack on the one or more input nets and the one or more output nets versus minimizing the absolute difference of the slack between the one or more input nets and the one or more output nets comprises moving the selected latch in two dimensions within the bounding box while accounting for both maximizing the slack and minimizing the absolute difference of the slack.

14. The system of claim 13, wherein when maximizing the slack and minimizing the absolute difference of the slack are not able to be balanced, the selected latch is moved to optimize one of maximizing the slack or minimizing the absolute difference of the slack at an expense of another one.

15. The system of claim 9, wherein repeating the iterative process for the latches in the current level of the connectivity and proceeding to perform the iterative process for the latches in the next level of the connectivity comprises checking for a stop condition.

16. The system of claim 15, wherein when the stop condition is met, the iterative process stops and when the stop condition is not met, the iterative process continues.

17. A computer program product comprising a computer readable storage medium having program instructions embodied therewith, the program instructions executable by a processor to cause the processor to perform operations comprising:
placing latches in a path between a source and one or more sinks in an integrated circuit (IC) design;
ordering the latches by a level of connectivity from the source to the one or more sinks; and
performing an iterative process comprising:
selecting a selected latch of a current level of the connectivity;
drawing a bounding box displayed around the selected latch to encompass one or more input nets and one or more output nets for the selected latch;
using a two-dimensional optimizer to find a new placement location for the selected latch by solving for optimization criteria, the optimization criteria comprising:
maximizing slack on the one or more input nets and the one or more output nets of the selected latch;
minimizing an absolute difference of the slack between the one or more input nets and the one or more output nets of the selected latch; and
identifying the new placement location within the bounding box that balances maximizing the slack on the one or more input nets and the one or more output nets versus minimizing the absolute difference of the slack between the one or more input nets and the one or more output nets;

updating a current location of the selected latch between the source and the one or more sinks to be the new placement location identified within the bounding box; and repeating the iterative process for the latches in the current level of the connectivity and proceeding to performing the iterative process for the latches in a next level of the connectivity.

18. The computer program product of claim 17, wherein ordering the latches by the level of connectivity from the source to the one or more sinks comprises ranking the latches in a sequential order of levels starting with the latches closest to the source being in a lowest level through the latches closest to the one or more sinks being in a highest level, while the latches in between the lowest level and the highest level are ranked in intermediary levels.

19. The computer program product of claim 17, wherein maximizing slack on the one or more input nets and the one or more output nets of the selected latch comprises moving the selected latch in two dimensions within the bounding box to increase the slack.

20. The computer program product of claim 17, wherein minimizing the absolute difference of the slack between the one or more input nets and the one or more output nets of the selected latch comprises moving the selected latch in two dimensions within the bounding box to equalize the absolute difference of the slack such that the slack on the one or more input nets and the one or more output nets of the selected latch is about equal.

\* \* \* \* \*